United States Patent
Musil et al.

(10) Patent No.: US 10,160,603 B2
(45) Date of Patent: Dec. 25, 2018

(54) SINGULATING VIBRATION FEEDER

(71) Applicants: Jiri Musil, Plzen-Rdobycice (CZ); Anders Blicher Petersen, Odense NV (DK)

(72) Inventors: Jiri Musil, Plzen-Rdobycice (CZ); Anders Blicher Petersen, Odense NV (DK)

(73) Assignee: NEWTEC ENGINEERING A/S, Odense M (DK)

( * ) Notice: Subject to any disclaimer, the term of this patent is extended or adjusted under 35 U.S.C. 154(b) by 0 days.

(21) Appl. No.: 15/578,793

(22) PCT Filed: Jun. 2, 2016

(86) PCT No.: PCT/DK2016/000025
§ 371 (c)(1),
(2) Date: Dec. 1, 2017

(87) PCT Pub. No.: WO2016/192730
PCT Pub. Date: Dec. 8, 2016

(65) Prior Publication Data
US 2018/0134496 A1 May 17, 2018

(30) Foreign Application Priority Data

Jun. 2, 2015 (DK) .................................. 2015 00322

(51) Int. Cl.
| B65G 27/30 | (2006.01) |
| B65G 27/04 | (2006.01) |
| B65G 47/14 | (2006.01) |
| B65G 47/244 | (2006.01) |

(52) U.S. Cl.
CPC ............. *B65G 27/30* (2013.01); *B65G 27/04* (2013.01); *B65G 47/1492* (2013.01); *B65G 47/244* (2013.01); *B65G 2201/0211* (2013.01); *B65G 2812/0384* (2013.01)

(58) Field of Classification Search
CPC .......................... B65G 47/1492; B65G 47/244
USPC ............. 198/394, 752.1, 753, 759, 760, 766
See application file for complete search history.

(56) References Cited

U.S. PATENT DOCUMENTS

| 4,260,051 A * | 4/1981 | Burghart ................ B65G 27/30 198/760 |
| 4,405,043 A * | 9/1983 | Burghart ................ B65G 27/30 198/709 |
| 5,301,814 A * | 4/1994 | Lower ....................... B07B 1/38 198/770 |
| 5,314,056 A * | 5/1994 | Davis ................. B65G 47/1492 198/396 |
| 5,460,259 A * | 10/1995 | Burgess, Jr. ........... B65G 27/08 198/763 |
| 5,967,294 A * | 10/1999 | Patterson ............... B65G 27/08 198/760 |

(Continued)

*Primary Examiner* — Douglas A Hess
(74) *Attorney, Agent, or Firm* — Harness, Dickey & Pierce, P.L.C.

(57) ABSTRACT

The problem of singulating oblong articles (1*a*, 1*b*, 1*c*, 2*a*, 2*b*) that are unloaded in an arbitrary orientation onto a conveyor has been solved in that the conveying trough (4) is divided into a central, lower part (5) and surrounding upwards-and-outwards extending parts (6, 7), whereby the central part (5) vibrates with a longitudinal amplitude that is higher than that of the upwards-and-outwards extending parts (6, 7) at the same frequency.

5 Claims, 2 Drawing Sheets

(56) References Cited

U.S. PATENT DOCUMENTS

Figure 1:
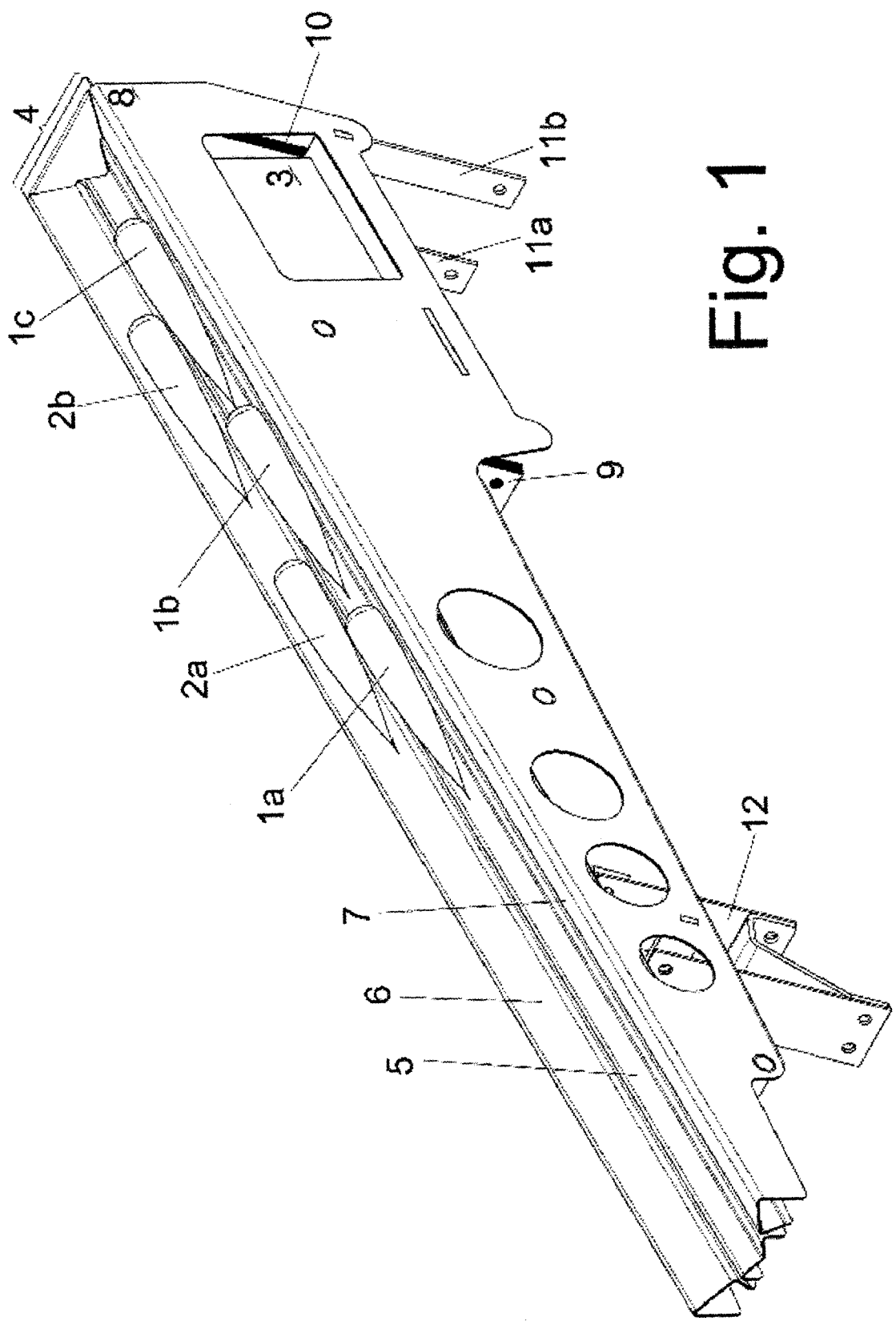

| | | | | |
|---|---|---|---|---|
| 6,702,102 B2* | 3/2004 | Kraus | ................... | B06B 1/16 |
| | | | | 198/758 |
| 6,834,756 B2* | 12/2004 | Sullivan, Jr. | ........... | B65G 11/02 |
| | | | | 198/750.1 |
| 7,216,757 B1* | 5/2007 | Patterson | ............... | B65G 27/30 |
| | | | | 198/750.8 |
| 7,322,569 B2* | 1/2008 | Kraus | ................. | B65G 27/22 |
| | | | | 198/766 |
| 8,061,503 B2* | 11/2011 | Ancarani | ........... | B65G 47/2445 |
| | | | | 198/398 |
| 8,770,389 B2* | 7/2014 | Millard | ................. | B65G 27/24 |
| | | | | 198/760 |
| 9,169,076 B2* | 10/2015 | Schultheis | ............... | B07B 1/30 |
| 9,463,935 B1* | 10/2016 | Karpinsky | ............ | B65G 47/24 |

* cited by examiner

SINGULATING VIBRATION FEEDER

CROSS-REFERENCE TO RELATED APPLICATIONS

This application is a 371 U.S. National Stage of International Application No. PCT/DK2016/000025, filed Jun. 2, 2016, which claims the benefit of and priority to Danish Patent Application No. PA 2015 00322, filed Jun. 2, 2015. The entire disclosures of the above applications are incorporated herein by reference.

The invention relates to a feeder or conveyor for articles that are able be oriented in a longitudinal direction, such as certain oblong vegetables, e.g. carrots, fruit, or certain varieties of potato. It is desirable to perform unravelling of a portion as well as singulation, which is a term for conveying the articles in a single row.

Singulators are used when a clump or pack of items are collected, and it is desired to transport them singly for further processing, such as packing, counting, or grading. A particular problem is met when it is desired to pack items into bags, for instance fruits that are portioned by counting or weighing. If the dimension of the fruit is so large that two pieces of fruit cannot pass the opening of the bag simultaneously, there is a considerable risk of jamming, which causes delays. Jams may be sorted out, but it takes time, has to occur against the friction of the conveyor belt that carries the fruit, and against the time pressure of more fruit arriving. In the case of grading, if the product is not singulated properly and overlaps appear, correct grading is not possible or very difficult as it can be very hard to distinguish between the items. For this reason it is considered preferable to have the fruit arrive one at a time, but in quick succession.

One solution for this may be found in U.S. Pat. No. 5,314,056, which describes a conveying device having a guide trough extending longitudinally from a receiving end to a discharge end, the trough having inclined and transversely-opposed sidewalls in which travels an endless feed belt longitudinally through the guide trough from the receiving end to the discharge end, the feed belt having upwardly extending outer portions which are slidably supported on the inclined sidewalls of the guide trough, the feed belt forming a concave conveyor surface for conveying food articles through the guide trough. The trough with the upwards-facing conveying feed belt is continuously vibrated. The combination of the two movements ensures the conveying and singulation, however it is a complex apparatus with fast-moving parts and involving wear of the feed belt mechanism. Another problem with this principle of operation is that it is not capable of quick start and stop, which is a requirement in high-speed handling of products.

Wear is avoided in constructions of conveyors involving vibrational drives of the electromagnetic and piezoelectric types, and many such constructions have been described in the art. A preferable type is the dynamically balanced type, in which a conveying trough is vibrated with respect to a counterweight in order to reduce the reaction forces transmitted to the support structure. A construction of this type may be found in U.S. Pat. No. 4,260,051, which describes a conveying device in the form of an elongated trough resiliently connected to a surrounding frame functioning as a counterweight, and driving means to reciprocally drive said components in opposed relative directions. While this construction is outwardly vibration-free and will singulate round products that are capable of rolling in any direction, it does not work well with oblong products, unless a long section of apparatus is used.

There is hence a need for an apparatus that avoids the above limitations and has a high capacity per unit length of conveyor.

This is obtained in a construction based on balanced vibrational conveying at a particular frequency that will perform both singulation and conveying while having few moving parts and no frictional wear, which is particular in that the conveying trough is in three parts, a lower part forming part of a shallow trough connected to means that cause its longitudinal vibration, and a pair of upwards-and-outwards extending parts connected to further means that enable a longitudinal reciprocating movement at said particular frequency that has a smaller amplitude than the longitudinal vibration of the lower part. The further means may be an independent driving mechanism for the upwards-and-outwards extending parts, they may be an elastic coupling between the lower part and the upwards—and outwards extending parts, or they may form part of the means that cause the longitudinal vibration of the shallow trough.

An advantageous embodiment is particular in that the means that cause the longitudinal vibration is a vibration driver arrangement that acts between the shallow trough and a frame as a counterweight, in which the upwards-and-outwards extending parts of the trough are joined to the frame, and in which the respective vibrating masses of the trough are arranged such that the amplitude of vibration of the frame is smaller than the amplitude of the lower part of the shallow trough. This is a dynamically balanced conveyor that has shown itself to be particularly efficient in unravelling a portion and in performing singulation. It is speculated that the reason for this is that the shallow trough having the largest amplitude is at the bottom, and the articles are more, or less pulled from below.

Another advantageous embodiment of the invention is particular in that the means connected to the upwards-and-outwards extending parts of the trough are elastic means, the other end of which are connected to the lower part, said elastic means having an elastic constant that in combination with the mass of each upwards-and-outwards extending part ensures a longitudinal reciprocating movement with a smaller amplitude than the amplitude of the lower part of the trough when said lower part is vibrated. This embodiment is particularly suited for retrofitting upwards-and-outwards extending parts that perform according to the invention to a pre-existing vibration conveyor with a trough. This requires two oblong and flat pieces of material, supported by elastic means that are in contact with the trough. The oblong and flat pieces of material are mounted so that they form replacement upper upwards-and-outwards extending parts of the transporting trough.

A further advantageous embodiment of the invention is particular in that the outer enclosure for the conveyor/singulator is integral to the upwards-and-outwards extending parts of the trough. This means that the enclosure for the apparatus forms part of the mass that creates the countermovement with respect to the lower part of the trough and it also gives a greater freedom in designing the elastic means for supporting the oblong and flat pieces of material in the case that the upwards-and-outwards extending parts are not part of the counterweight. One way of describing an apparatus according to this embodiment of the invention is that the shroud enclosing the apparatus forms part of the counterweight and also the upper part of the conveying trough for the articles.

With reference to the drawing an embodiment of the invention will be described in further detail. In the drawings, FIG. 1 in parallel projection shows a vibratory conveyor and singulator according to one embodiment of the invention, FIG. 2 shows the end of the vibratory conveyor in enlargement, and FIG. 3 shows a cross section of an alternative embodiment.

Figure 2:
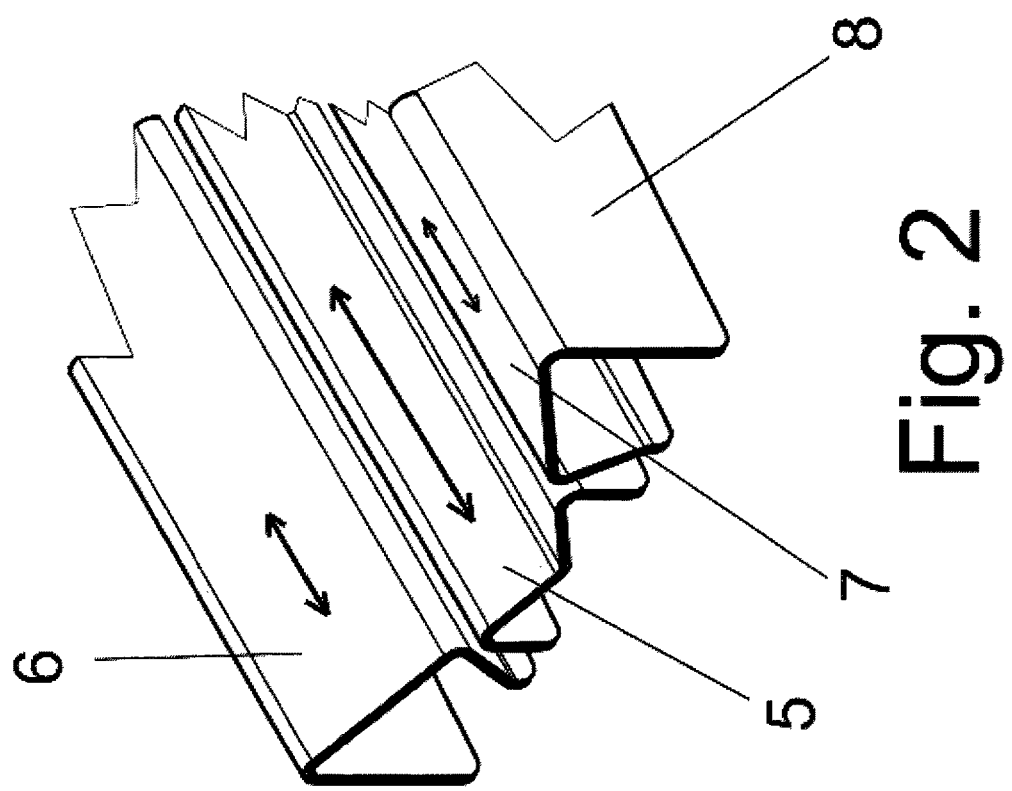

In FIG. 1 are shown 3 stylised oblong articles 1a, 1b, 1c, 2a, 2b, representing carrots, cucumbers, potatoes, or the similar. They are resting in a trough 4 composed of a bottom part 5 and two symmetrically placed upper parts 6, 7. A vibrational drive 3 is placed between the bottom part 5 and a frame 8 that acts as a counterweight. The bottom part 5 is commonly vibrated in resonance with the elastic means connecting the bottom part 5 and the frame. The elastic means are visible in part in FIG. 1 with the designations 9 and 10, and their steepness with respect to the direction of gravity will decide the balance between an upwards thrust and a longitudinal movement. This disposition of drive means and elastic supportive means between a vibrating trough and a counterweight is well-known per se in the art. The whole arrangement of bottom part, frame, and drive means is supported on elastic means 11a, 11b, and 12. In this way no or little vibration is transmitted to the base or foundation of the equipment, which is not shown. The upper parts 6, 7 are integral parts of the frame 8 that also acts as an enclosure for the mechanism and is hence part of the counterweight.

When power is supplied to the conveyor/singulator, the bottom part 5 and the upper parts 6, 7 are vibrating in counterphase (dependent on the resonant frequency of the combination and the driving frequency), but the parts 6, 7 have a smaller amplitude, and this means a net movement of the articles 1a, 1b, 1c, 2a, 2b from the entry point of the conveyor/singulator to the end. As the articles 1a, 1b, 1c, 2a, 2b proceed along the trough, those articles 1a, 1b, 1c at the bottom, driven by the bottom part 5, proceed a little faster, and hence a singulation occurs. The relative movements of the bottom part 5 and the upwards-and-outwards extending parts 6, 7 are indicated in FIG. 2 by means of arrows that have exaggerated lengths. The relative excursions are indicated by the difference in length.

Figure 3:
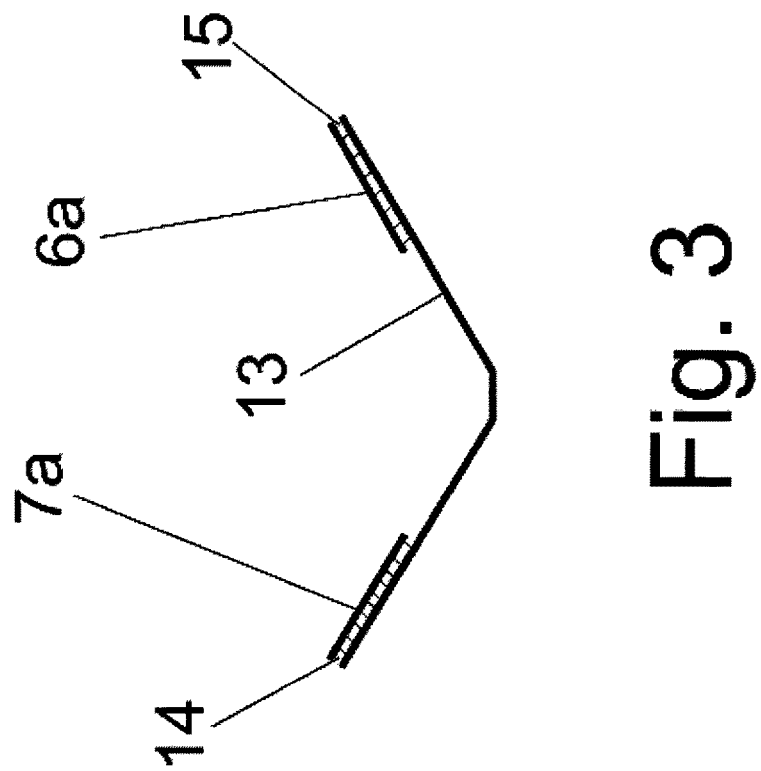

In FIG. 3 is shown a cross section of a conveying and singulating trough according to a different embodiment of the invention. In this case a trough 13 is vibrated in its entirety, but the upwards-and-outwards extending parts 6a and 7a are not driven directly, but indirectly from the trough 13, via elastic means 14, 15 indicated between the trough 13 and the longitudinal slats 6a, 7a. Such elastic means are distributed along the length of the slats 6a and 7a and will be designed with properties that permit the movement with reduced amplitude of the two slats.

In order to increase the mass of the upwards-and-outwards extending parts 6a and 7a it is possible to join these to the enclosure of the apparatus. This lowers the resonant frequency and permits the use of stiffer elastic support means 14, 15 when deciding on a natural resonant frequency between the trough 13 and the upwards-and-outwards extending parts 6a and 7a.

In conclusion, the problem of singulating oblong articles that are unloaded in an arbitrary orientation onto a conveyor has been solved in that the conveying trough is divided into a central, lower part and surrounding upwards-and-outwards extending parts, whereby the central part vibrates with a longitudinal amplitude that is higher than that of the upwards-and-outwards extending parts.

The foregoing description of the specific embodiments will so fully reveal the general nature of the present invention that others skilled in the art can, by applying current knowledge, readily modify or adapt for various applications such specific embodiments without undue experimentation and without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of forms without departing from the invention.

Thus, the expressions "means to . . . " and "means for . . . ", or any method step language, as may be found in the specification above and/or in the claims below, followed by a functional statement, are intended to define and cover whatever structural, physical, chemical, or electrical element or structure, or whatever method step, which may now or in the future exist which carries out the recited functions, whether or not precisely equivalent to the embodiment or embodiments disclosed in the specification above, i.e., other means or steps for carrying out the same function can be used; and it is intended that such expressions be given their broadest interpretation.

The invention claimed is:

1. A vibrating conveyor/singulator based on the dynamically balanced principle with a counterweight, parts of which extend along a conveying trough, creating a relative movement with a particular frequency, comprising a conveying trough defined by three parts, a lower part forming part of a shallow trough connected to a vibration driver that cause its longitudinal vibration, and a pair of upwards-and-outwards extending parts disposed along opposite sides of the lower part and connected to means that enable a longitudinal reciprocating movement at said particular frequency and at a smaller amplitude than the longitudinal vibration of the lower part.

2. A vibrating conveyor/singulator according to claim 1, wherein the vibration driver arrangement that acts between the shallow trough and a frame as a counterweight, in which the upwards-and-outwards extending parts of the trough are joined to the frame, and in which the respective vibrating masses of the trough are arranged such that the amplitude of vibration of the frame is smaller than the amplitude of the lower part of the shallow trough.

3. A vibration conveyor/singulator according to claim 2 wherein the outer enclosure for the conveyor/singulator is integral to the upwards-and-outwards extending parts of the trough.

4. A vibrating conveyor/singulator according to claim 1, wherein the means connected to the upwards-and-outwards extending parts of the trough are elastic means, the other end of which are connected to the lower part of the trough, said elastic means having an elastic constant that in combination with the mass of each upwards-and-outwards extending part ensures a longitudinal reciprocating movement with a smaller amplitude than the amplitude of the lower part of the trough when said lower part is vibrated.

5. A vibration conveyor/singulator according to claim 4 wherein the outer enclosure for the conveyor/singulator is integral to the upwards-and-outwards extending parts of the trough.

* * * * *